United States Patent
Tanabe

(10) Patent No.: US 11,532,088 B2
(45) Date of Patent: Dec. 20, 2022

(54) ARITHMETIC PROCESSING APPARATUS AND METHOD

(71) Applicant: FUJITSU LIMITED, Kawasaki (JP)

(72) Inventor: Satoshi Tanabe, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 211 days.

(21) Appl. No.: 16/986,323

(22) Filed: Aug. 6, 2020

(65) Prior Publication Data
US 2021/0056711 A1 Feb. 25, 2021

(30) Foreign Application Priority Data

Aug. 23, 2019 (JP) .............................. JP2019-153244

(51) Int. Cl.
*G06T 7/215* (2017.01)
*G06N 3/08* (2006.01)
*G06N 3/04* (2006.01)

(52) U.S. Cl.
CPC .............. *G06T 7/215* (2017.01); *G06N 3/04* (2013.01); *G06N 3/08* (2013.01); *G06T 2207/10016* (2013.01)

(58) Field of Classification Search
CPC .......... G06N 3/04; G06N 3/08; G06N 3/0445; G06N 3/0454; G06T 7/215; G06T 2207/10016
See application file for complete search history.

(56) References Cited

U.S. PATENT DOCUMENTS

| 2012/0272814 A1* | 11/2012 | Menzies-Gow | G10H 3/06 84/724 |
| 2018/0139458 A1* | 5/2018 | Wang | H04N 19/59 |
| 2019/0080470 A1* | 3/2019 | Zhu | G06T 7/269 |
| 2020/0357099 A1* | 11/2020 | Long | G06V 10/30 |

FOREIGN PATENT DOCUMENTS

| JP | 2007-148922 A | | 6/2007 |
| JP | 2016-041142 A | | 3/2016 |
| JP | 2018-049052 A | | 3/2018 |
| JP | 2018049052 A | * | 3/2018 |

* cited by examiner

*Primary Examiner* — Marcos L Torres
(74) *Attorney, Agent, or Firm* — Fujitsu Patent Center

(57) ABSTRACT

An arithmetic processing apparatus, includes a memory; and a processor coupled to the memory and the processor configured to: estimate an optical flow between consecutive frames of a moving image, and generate a sound wave corresponding to a target moving image, based on an optical flow estimated for the target moving image, and a deep neural network that generates a sound wave corresponding to an input optical flow and that has performed learning, by associating with time, an optical flow estimated for a moving image with sound wave and a sound wave of the moving image with sound wave.

14 Claims, 21 Drawing Sheets

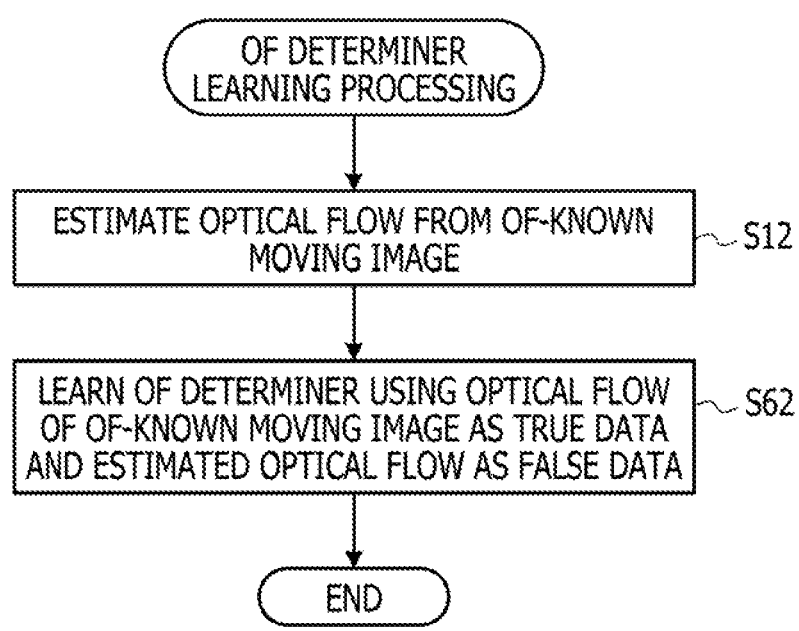

ARITHMETIC PROCESSING APPARATUS AND METHOD

CROSS-REFERENCE TO RELATED APPLICATION

This application is based upon and claims the benefit of priority of the prior Japanese Patent Application No. 2019-153244, filed on Aug. 23, 2019, the entire contents of which are incorporated herein by reference.

FIELD

The embodiments discussed herein are related to an arithmetic processing apparatus and an arithmetic processing method.

BACKGROUND

In the entertainment field, non-contact musical instruments have attracted attention. As a non-contact musical instrument, there is an electronic musical instrument called a theremin by which a melody may be played without physical contact. In the theremin, the pitch and volume are controlled by the position of the hand in the space but not by the contact of the hand with the main body. For example, when the player moves the hand close to the pitch antenna or volume antenna, the stray capacitance between the player and the antenna changes, and this changes the oscillatory frequency of the oscillator and the sound to be produced.

There has been proposed a virtual musical instrument performance program which may be easily installed in a portable information terminal and does not impose a burden on the user. This virtual musical instrument performance program causes a computer to perform an acquisition procedure, a determination procedure, an analysis procedure, and an output control procedure. The acquisition procedure acquires a captured image of the user. The determination procedure extracts a pixel portion indicating the posture of the user in the captured image acquired in the acquisition procedure, and determines the kind of musical instrument corresponding to the posture using a performance posture determination model generated by machine learning based on the pixel portion. The analysis procedure analyzes the optical flow of the pixel portion. The output control procedure outputs the musical instrument sound of the musical instrument according to the analysis result obtained in the analysis procedure. For example, Japanese Laid-open Patent Publication No. 2018-49052 is disclosed as a related art.

SUMMARY

According to an aspect of the embodiments, An arithmetic processing apparatus, includes a memory; and a processor coupled to the memory and the processor configured to: estimate an optical flow between consecutive frames of a moving image; and generate a sound wave corresponding to a target moving image, based on an optical flow estimated for the target moving image and a generator that generates a sound wave corresponding to an input optical flow and that has performed learning by associating with time an optical flow estimated for a moving image with sound wave and a sound wave of the moving image with sound wave.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 21 is a flowchart illustrating an example of OF determiner learning processing.

DESCRIPTION OF EMBODIMENTS

However, there is a problem that there are few variations of sounds that may be sounded since sounds prepared in advance are sounded based on the rule determined in advance. For example, in a case in which it is desired to output a sound wave corresponding to an arbitrary operation of the user, the variation of the sound wave to be output may be increased when the rule of a sound wave to be output is determined for each action. However, it is difficult and unrealistic to create the rule of a sound wave corresponding to an arbitrary operation.

In view of the above, it is desirable to generate a sound wave corresponding to an arbitrary operation.

Hereinafter, an example of embodiments according to the disclosed technology will be described with reference to the drawings.

First Embodiment

Figure 1:
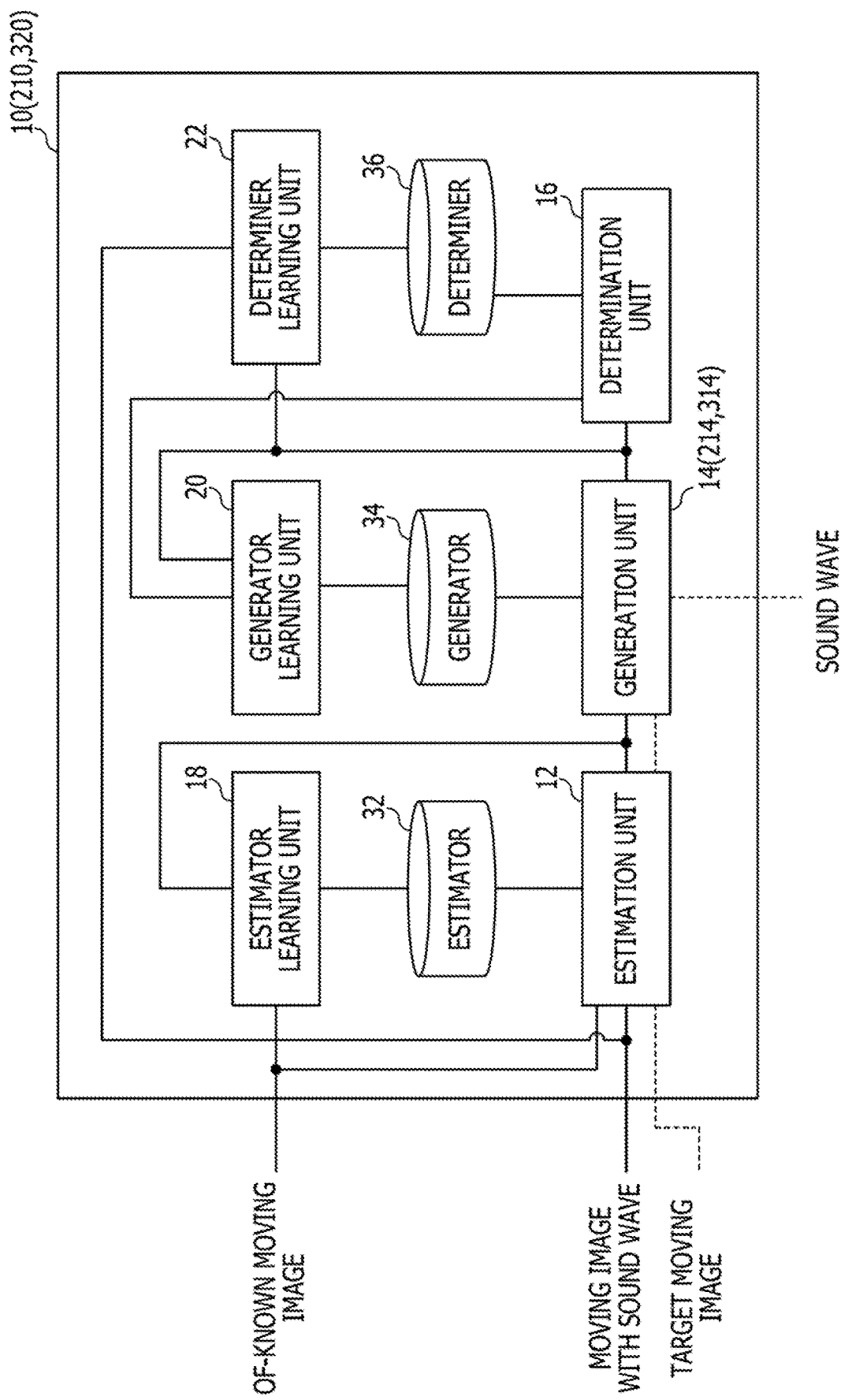
FIG. 1 is a functional block diagram of an arithmetic processing apparatus according to first to third embodiments.

As illustrated in FIG. 1, an arithmetic processing apparatus 10 according to a first embodiment functionally includes an estimation unit 12, a generation unit 14, a determination unit 16, an estimator learning unit 18, a generator learning unit 20, and a determiner learning unit 22. An estimator 32, a generator 34, and a determiner 36 are stored in a predetermined storage area of the arithmetic processing apparatus 10.

When learning each of the estimator 32, the generator 34, and the determiner 36, a moving image with sound wave and a moving image of which the optical flow is known are input to the arithmetic processing apparatus 10. Hereinafter, the optical flow is also referred to as "OF". The moving image of which the optical flow is known is referred to as "OF-known moving image". The respective functional units coupled to each other by solid lines in FIG. 1 function and each of the estimator 32, the generator 34, and the determiner 36 is learned.

The moving image with sound wave includes a sound wave and a moving image including a plurality of frames and is a moving image in which a time (or a frame number) t associated with each frame of the moving image is associated with a sound wave at the time t. The OF-known moving image is a moving image created by, for example, computer graphics or image synthesis so that the association of each pixel between frames is known, and thus the optical flow between frames is known.

For example, in a case in which a moving image or the like obtained by imaging a state in which the user performs an arbitrary operation is input to the arithmetic processing apparatus 10 as a target moving image, the respective functional units coupled to each other by broken lines in FIG. 1 function and a sound wave corresponding to the target moving image is generated and output.

Hereinafter, the respective functional units of the arithmetic processing apparatus 10 will be described.

The estimation unit 12 divides an input moving image into frames and estimates an optical flow from images of two consecutive frames.

The optical flow is a set of vectors O(x, y) representing the motion of an object in an image. O(x, y) is represented by Equation (1) below.

$$O(x, y) = \begin{pmatrix} u(x, y) \\ v(x, y) \end{pmatrix}, (0 \leq x \leq W, 0 \leq y \leq H) \quad (1)$$

Figure 2:
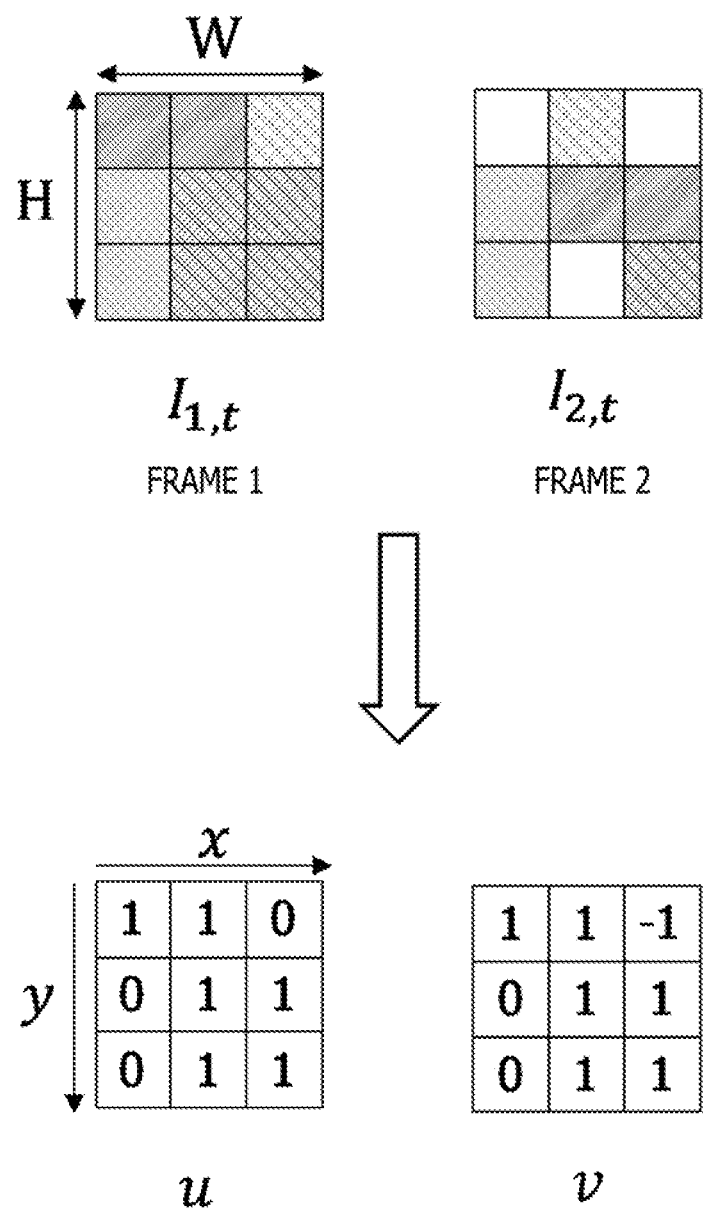
FIG. 2 is a diagram for explaining an optical flow.

As illustrated in FIG. 2, x and y respectively represent the x and y coordinates in an image and W and H respectively represent the width and height of the image. In FIG. 2, u and v are an amount of movement in the x-coordinate direction and an amount of movement in the y-coordinate direction of corresponding pixels in images of two consecutive frames between the images.

In the following description, the frame at a time (or frame number) t associated with each frame of a moving image is referred to as "frame 1" and denoted by "$I_{1,t}$" as the preceding frame between two consecutive frames and the subsequent frame is referred to as "frame 2" and denoted by "$I_{2,t}$". For example, the estimation unit 12 estimates the optical flow at the time t from $I_{1,t}$ and $I_{2,t}$. Time series-data of the optical flow is estimated by estimating the optical flow at the respective times of t=1, 2, ..., M−1 (where M is the number of frames of the moving image).

Figure 3:
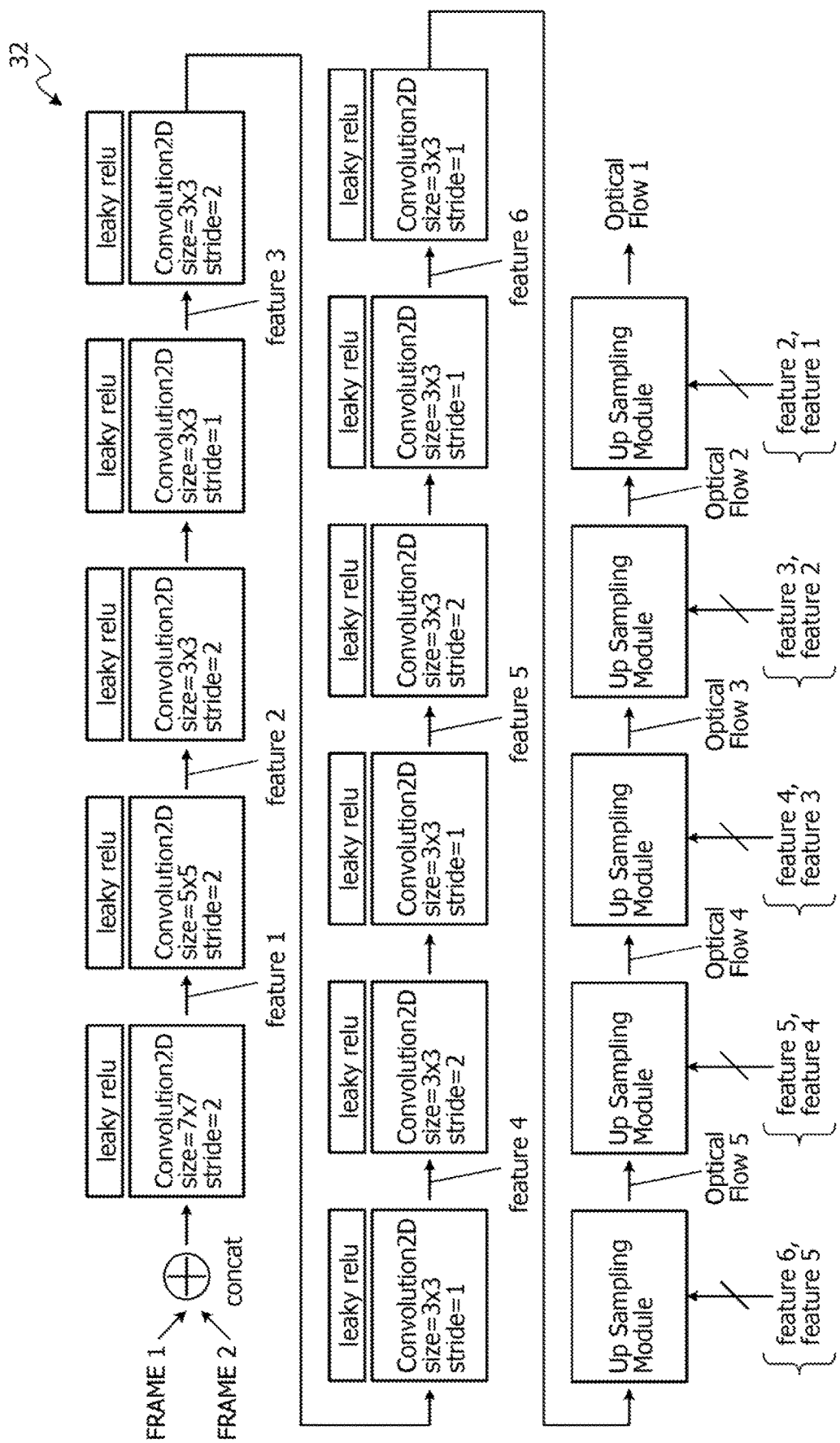
FIG. 3 is a diagram illustrating an example of an estimator.
Figure 4:
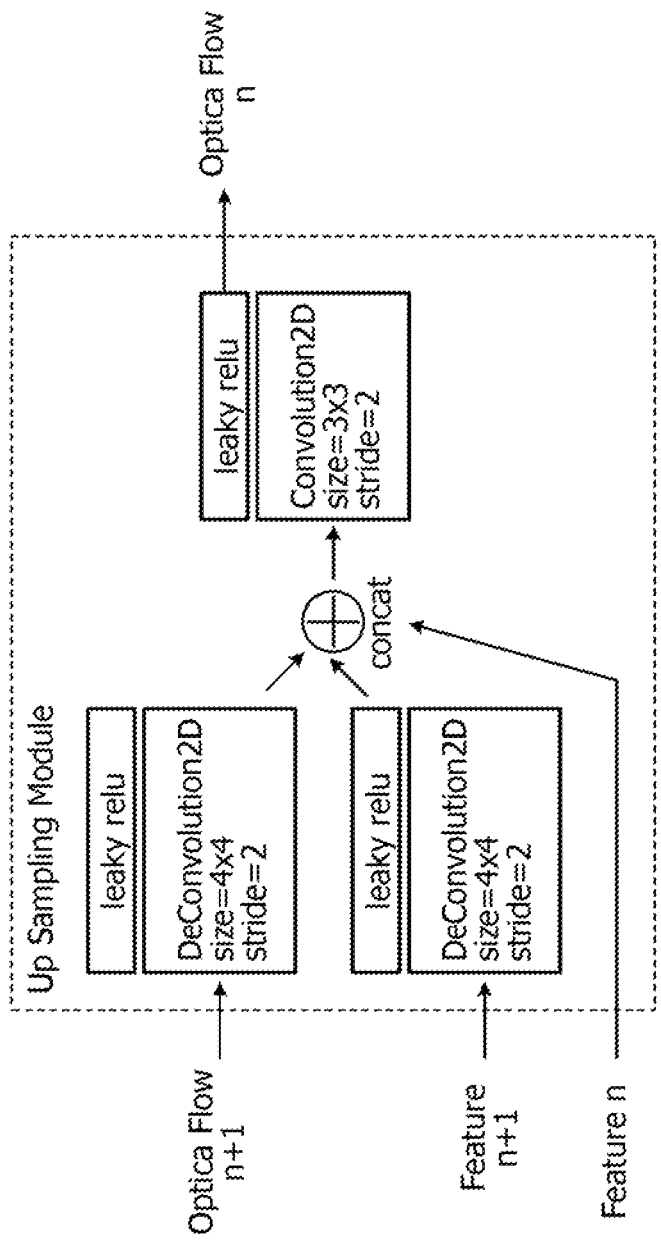
FIG. 4 is a diagram illustrating an example of an estimator.

For example, the estimation unit 12 estimates the optical flow using the estimator 32 including, for example, a convolutional neural network (CNN). FIGS. 3 and 4 illustrate an example of the estimator 32. FIGS. 3 and 4 illustrate an example of a CNN having a stack structure. In this case, the estimation unit 12 estimates the optical flow while gradually increasing the resolution from a low resolution to a high resolution. Since the parameter solution space of the low-resolution optical flow is narrower than that of the high-resolution optical flow, the optimization at the time of CNN learning is more likely to be appropriately performed than when the high-resolution optical flow is estimated from the beginning. Therefore, the estimation accuracy of optical flow may be improved using the CNN having a stack structure as the estimator 32.

Figure 5:
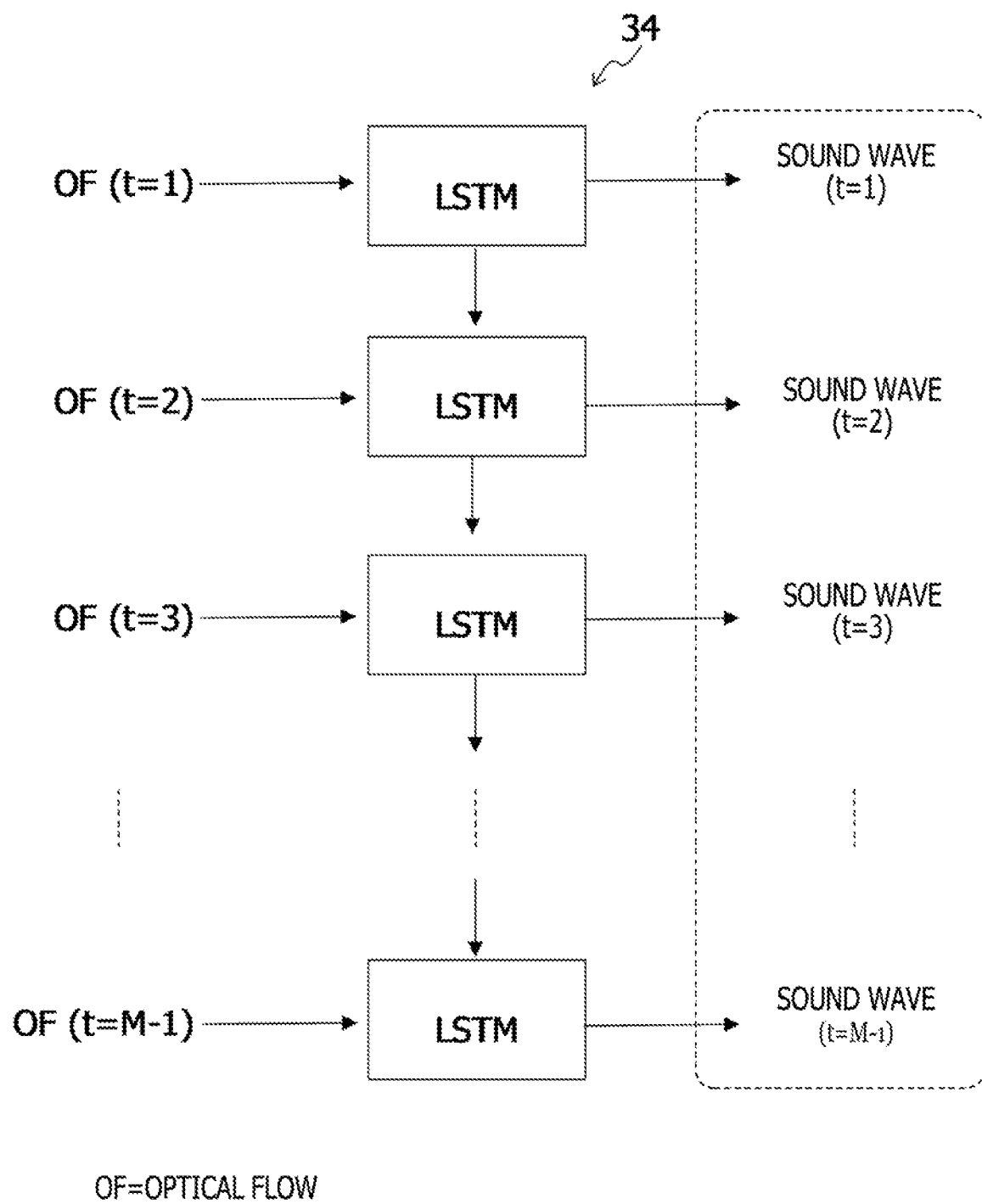
FIG. 5 is a diagram for explaining processing of a generation unit in the first embodiment.

The generation unit 14 generates a sound wave corresponding to the input moving image, based on the generator 34 that generates a sound wave corresponding to the input optical flow and the optical flow estimated for the input moving image by the estimation unit 12. For example, as illustrated in FIG. 5, the generator 34 is configured by a deep neural network such as a recurrent neural network (LSTM).

Figure 6:
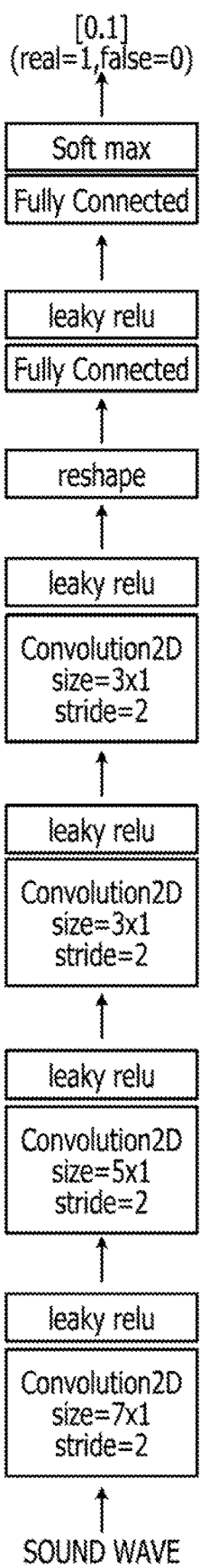
FIG. 6 is a diagram illustrating an example of a determiner.

The determination unit 16 determines whether the sound wave generated by the generation unit 14 is true or false using the determiner 36 that determines whether the input sound wave is true or false. For example, as illustrated in FIG. 6, the determiner 36 may be configured by a CNN.

The estimator learning unit 18 learns the estimator 32 by associating the known optical flow for the OF-known moving image with the optical flow estimated for the OF-known moving image by the estimation unit 12.

For example, the estimator learning unit 18 learns so as to minimize a loss function for optimizing the parameters of the estimator 32. The loss function may include a term indicating an error between the optical flow of the teacher data and the optical flow estimated for the teacher data by the estimation unit 12 when the OF-known moving image is used as the teacher data. The loss function may include a term indicating an error between the image warped using the estimated optical flow and the image of the teacher data and a term indicating an error of the edge portion.

For example, the estimator learning unit 18 learns the parameters of the estimator 32 so as to minimize a loss function $L_O$ represented by Equation (2) below by using stochastic gradient descent (SGD) or the like.

$$L_O = \sum_t \left\| O(I_{1,t}, I_{2,t}) - \overline{O}(I_{1,t}, I_{2,t}) \right\|_2 + \left\| W_{arp}(\overline{O}(I_{1,t}, I_{2,t}), I_{2,t}) - I_{1,t} \right\|_2 + \quad (2)$$
$$\left\| W_{arp}(\overline{O}(I_{1,t}, I_{2,t}), I_{2,t}) - W_{arp}(O(I_{1,t}, I_{2,t}), I_{2,t}) \right\|_2 +$$
$$\left\| E_{dge}(\overline{O}(I_{1,t}, I_{2,t})) - E_{dge}(O(I_{1,t}, I_{2,t})) \right\|_2$$

In Equation (2), $O(I_{1,t}, I_{2,t})$ is a known optical flow for frames 1 and 2 of the OF-known moving image. $\overline{O}(I_{1,t}, I_{2,t})$ ($\overline{O}$ is denoted as O with overbar in Equation (2)) is an optical flow estimated for the frames 1 and 2 of the OF-known moving image by the estimation unit 12.

The first term in Equation (2) is the mean square error of optical flow. The parameters of the estimator 32 are supposed to be optimized by minimizing the first term in theory, but the optimization does not proceed well by only minimizing the loss function of the first term in practice. When the parameters of the estimator 32 are not appropriately optimized, the optical flow may not be highly accurately estimated. In a case in which the estimation accuracy of optical flow is poor, an unintended sound wave is generated when the generation unit 14 generates a sound wave using the estimated optical flow.

Examples of the reason why the optimization does not proceed well with only the first term include the fact that the first term in Equation (2) takes a large value when the absolute value of the optical flow is large. This means that the data greatly affects when even a small amount of data having a large absolute value of optical flow is included in the teacher data. In this case, a problem arises that optimization of the parameters of the estimator 32 proceeds in a biased direction.

In order to alleviate this problem, an error term of an image warped using the estimated optical flow is added as the second and third terms in Equation (2). Since this error is not the value of the optical flow but the pixel value of the image, the value of this term does not reach a large value even if the absolute value of the optical flow is large. The value of this term does not fall outside the range (for example, 0 to 255) that the pixel value may take.

Figure 7:
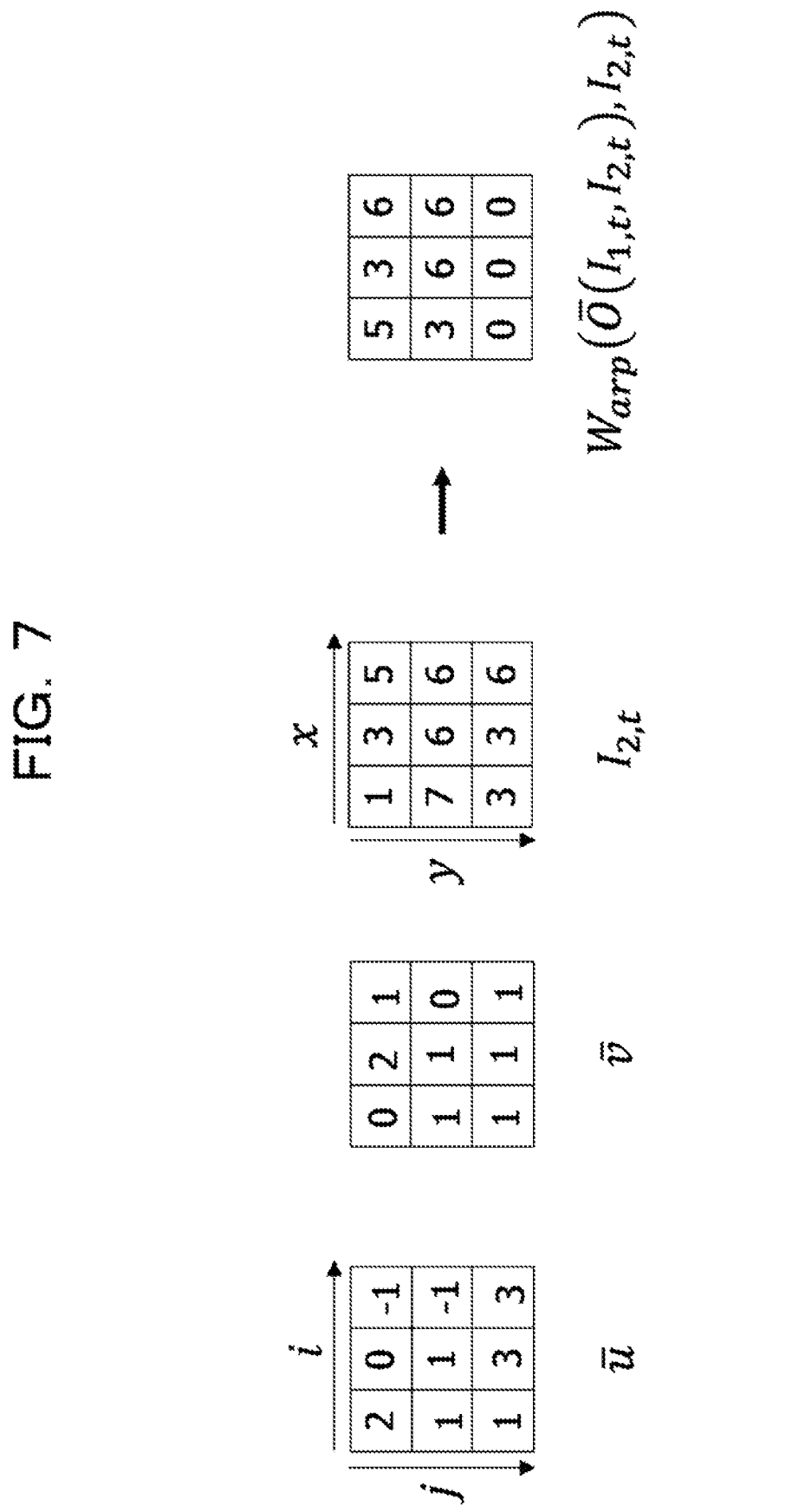
FIG. 7 is a diagram for explaining warping using an optical flow.

The warping function $W_{arp}$ in the second and third terms may be expressed by, for example, FIG. 7 and Equation (3) below.

$$\bar{O}(i, j) = \begin{pmatrix} \bar{u}(i, j) \\ \bar{v}(i, j) \end{pmatrix}, (0 \le i \le W, 0 \le j \le H) \quad (3)$$

$$W_{arp}(\bar{O}(I_{1,t}, I_{2,t}), I_{2,t})(i, j) =$$

$$\sum_x \sum_y I_{2,t}(x, y) \cdot \max(0, 1 - |i + \bar{u}(i, j) - x|) \cdot \max(0, 1 - |j + \bar{v}(i, j) - y|)$$

For example, the second term in Equation (2) represents an error between the frame 1 and an image warped using the frame 2 and the optical flows estimated for the frames 1 and 2. The third term represents an error between the image warped using the frame 2 and the optical flows estimated for the frames 1 and 2 and the image warped using the frame 2 and the known optical flows for the frames 1 and 2.

Examples of another reason why the optimization does not proceed well with only the first term include the fact that the edge portion of the estimated optical flow is blurred or a peak such as an unintended edge is generated. In order to alleviate this, a term indicating an error for improving the estimation accuracy of the edge portion of the optical flow is added as the fourth term in Equation (2). The edge function $E_{dge}$ in the fourth term may be expressed by, for example, Equation (4) below.

$$E_{dge}(\bar{O}(I_{1,t}, I_{2,t}))(i, j) = \bar{O}(i, j) - \sum_{x=-n}^{n} \sum_{y=-n}^{n} \frac{1}{4n^2} \cdot \bar{O}(i+x, j+y) \quad (4)$$

The second term in Equation (4) represents an averaging filter having vertical and horizontal sizes of 2n+1.

The generator learning unit 20 learns the generator 34 by associating the optical flow estimated for the moving image with sound wave by the estimation unit 12 and the sound wave of the moving image with sound wave with the frame time t.

For example, the generator learning unit 20 learns the parameters of the generator 34 so as to minimize the loss function including a term indicating an error between the sound wave of the moving image with sound wave and the sound wave generated by the generation unit 14. The loss function may also include a term indicating the degree to which the sound wave generated by the generation unit 14 is determined to be false by the determination unit 16.

For example, the generator learning unit 20 learns the parameters of the generator 34 so as to minimize a loss function $L_1$ represented by Equation (5) below by using stochastic gradient descent (SGD) or the like.

$$L_1 = \sum_t \{ \|W_{ave}(O(I_{1,t}, I_{2,t})) - W_{ave}(\bar{O}(I_{1,t}, I_{2,t}))\|_2 + \log(1 - D_{is}(W_{ave}(\bar{O}(I_{1,t}, I_{2,t})))) \} \quad (5)$$

In Equation (5), $W_{ave}(O(I_{1,t}, I_{2,t}))$ is a sound wave of a moving image with sound wave and $W_{ave}(O^-(I_{1,t}, I_{2,t}))$ is a sound wave generated by the generation unit 14 using the optical flow estimated for the moving image with sound wave by the estimation unit 12 as input. $D_{is}(W_{ave}(O^-(I_{1,t}, I_{2,t})))$ is the determination result for $W_{ave}(O^-(I_{1,t}, I_{2,t}))$ obtained by the determination unit 16 and is true (1) or false (0). The second term in Equation (5) is a term provided so that the sound wave generated by the generation unit 14 is closer to the sound wave of the moving image with sound wave, for example, closer to the real sound wave.

The determiner learning unit 22 learns the determiner 36 using the sound wave of the moving image with sound wave as true data and the sound wave generated by the generation unit 14 as false data. For example, the determiner learning unit 22 learns the parameters of the determiner 36 so as to minimize the loss function including a term that decreases as the true data is determined to be true and a term that decreases as the false data is determined to be false.

For example, the determiner learning unit 22 learns the parameters of the determiner 36 so as to minimize a loss function $L_2$ represented by Equation (6) below by using stochastic gradient descent (SGD) or the like.

$$L_2 = \Sigma_t \log(1 - D_{is}(W_{ave}(O(I_{1,t}, I_{2,t})))) + \Sigma_t \log(D_{is}(W_{ave}(\bar{O}(I_{1,t}, I_{2,t}))))  \quad (6)$$

Figure 8:
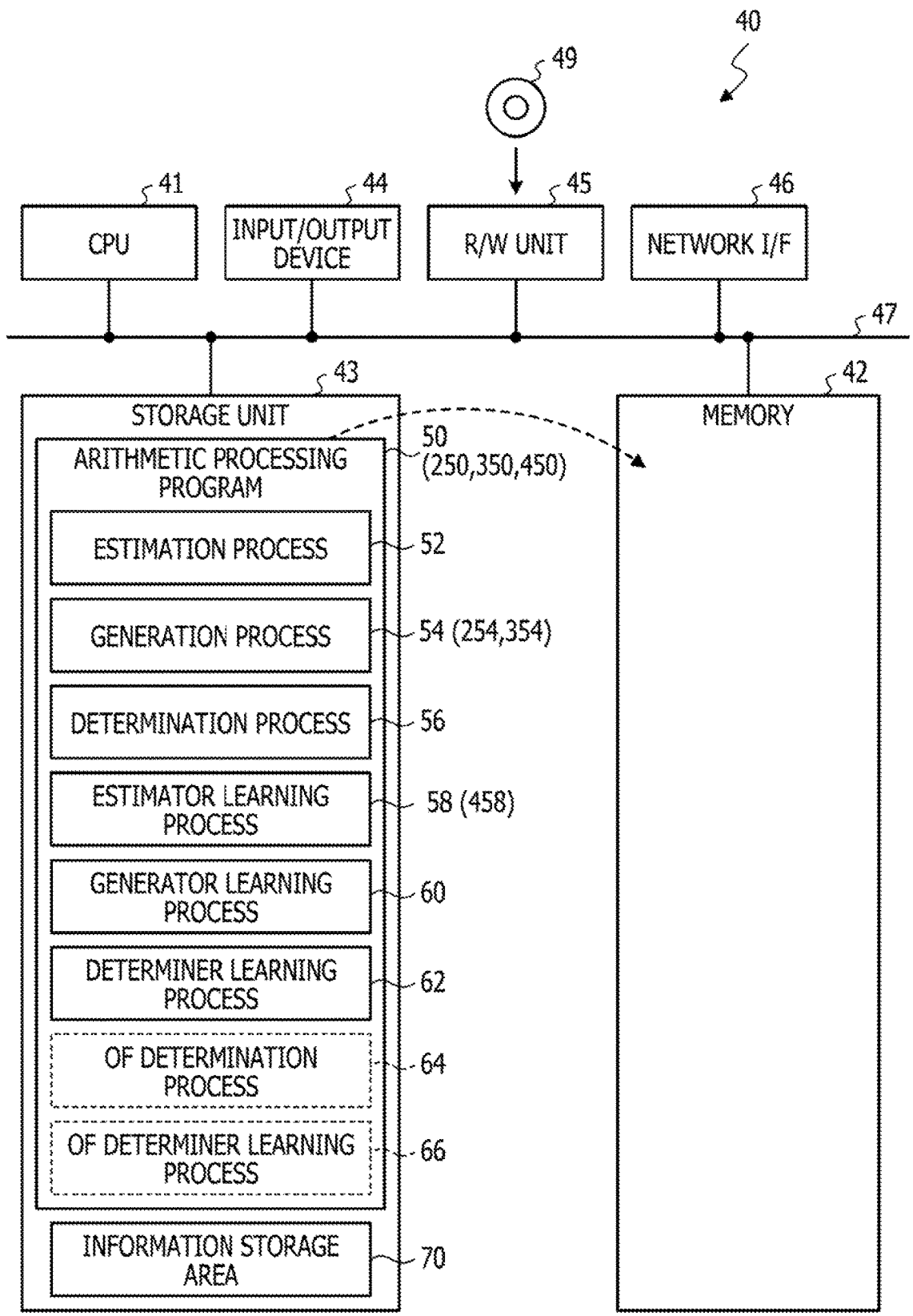
FIG. 8 is a diagram illustrating a schematic configuration of a computer functioning as an arithmetic processing apparatus according to first to fourth embodiments.

The arithmetic processing apparatus 10 may be implemented by, for example, a computer 40 illustrated in FIG. 8. The computer 40 includes a central processing unit (CPU) 41, a memory 42 serving as a temporary storage area, and a storage unit 43 that is nonvolatile. The computer 40 also includes an input/output device 44 such as an input unit and a display unit, and a read/write (R/W) unit 45 that controls reading and writing of data from and to a storage medium 49. The computer 40 also includes a communication interface (I/F) 46 that is coupled to a network such as Internet. The CPU 41, the memory 42, the storage unit 43, the input/output device 44, the R/W unit 45, and the communication I/F 46 are coupled to each other via a bus 47.

The storage unit 43 may be implemented by a hard disk drive (HDD), a solid state drive (SSD), a flash memory, or the like. The storage unit 43 serving as a storage medium stores an arithmetic processing program 50 for causing the computer 40 to function as the arithmetic processing apparatus 10. The arithmetic processing program 50 includes an estimation process 52, a generation process 54, a determination process 56, an estimator learning process 58, a generator learning process 60, and a determiner learning process 62. The storage unit 43 includes an information storage area 70 in which information configuring each of the estimator 32, the generator 34, and the determiner 36 is stored.

The CPU 41 reads the arithmetic processing program 50 from the storage unit 43, develops the arithmetic processing program 50 in the memory 42, and sequentially executes the processes of the arithmetic processing program 50. The CPU 41 operates as the estimation unit 12 illustrated in FIG. 1 by executing the estimation process 52. The CPU 41 also operates as the generation unit 14 illustrated in FIG. 1 by executing the generation process 54. The CPU 41 also operates as the determination unit 16 illustrated in FIG. 1 by executing the determination process 56. The CPU 41 also operates as the estimator learning unit 18 illustrated in FIG. 1 by executing the estimator learning process 58. The CPU 41 also operates as the generator learning unit 20 illustrated in FIG. 1 by executing the generator learning process 60. The CPU 41 also operates as the determiner learning unit 22 illustrated in FIG. 1 by executing the determiner learning process 62. The CPU 41 also reads information from the information storage area 70 and develops each of the estimator 32, the generator 34, and the determiner 36 in the memory 42. The computer 40 that has executed the arithmetic processing program 50 thus functions as the arithmetic processing apparatus 10. The CPU 41 that executes the program is hardware.

The function implemented by the arithmetic processing program 50 may also be implemented by, for example, a semiconductor integrated circuit such as an application-specific integrated circuit (ASIC).

Figure 10:
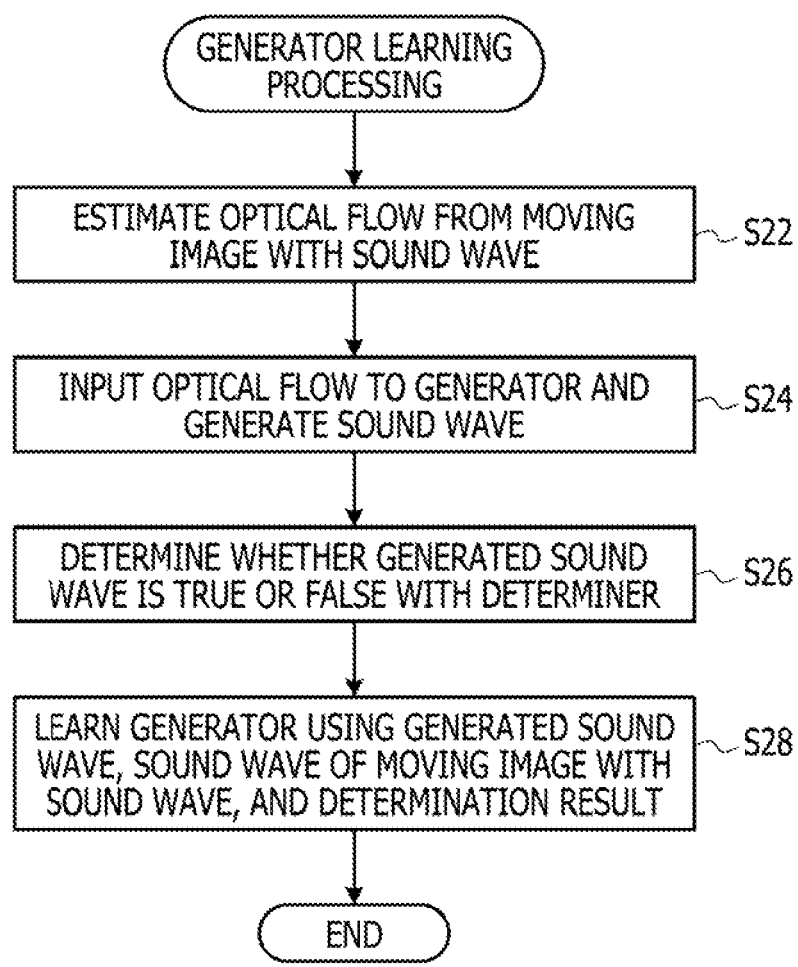
FIG. 10 is a flowchart illustrating an example of generator learning processing.
Figure 11:
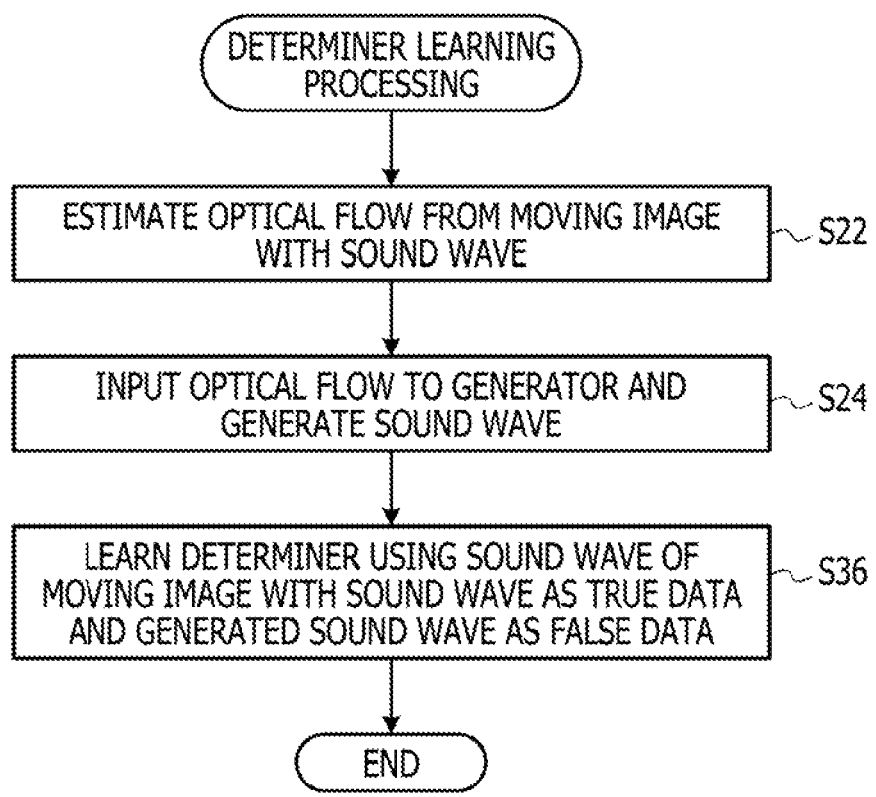
FIG. 11 is a flowchart illustrating an example of determiner learning processing.
Figure 12:
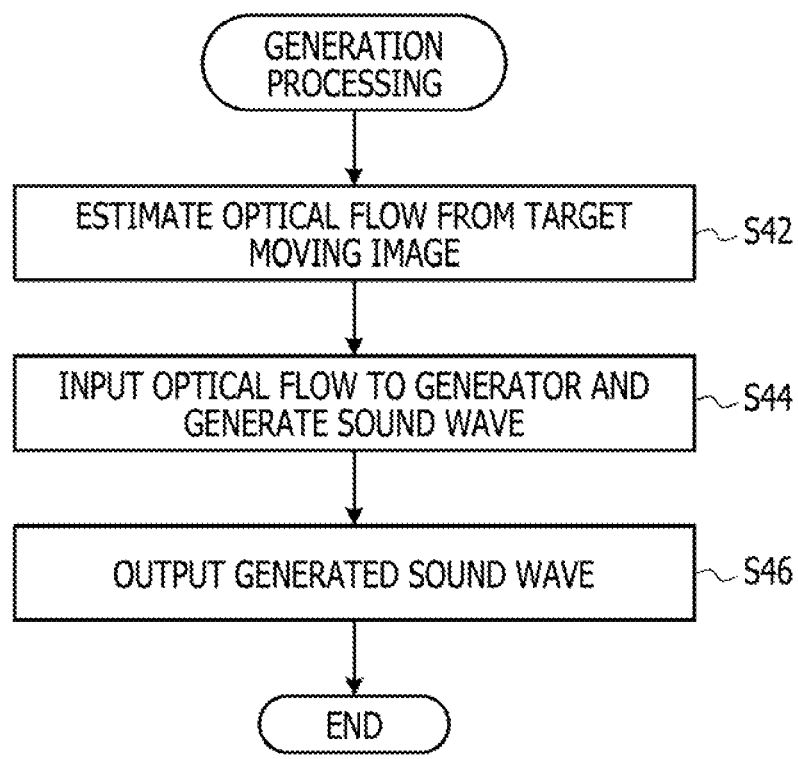
FIG. 12 is a flowchart illustrating an example of generation processing in the first embodiment.

Next, the operation of the arithmetic processing apparatus 10 according to the first embodiment will be described. When learning each of the estimator 32, the generator 34, and the determiner 36, the moving image with sound wave and the OF-known moving image are input to the arithmetic processing apparatus 10. Then, in the arithmetic processing apparatus 10, estimator learning processing illustrated in FIG. 9, generator learning processing illustrated in FIG. 10, and determiner learning processing illustrated in FIG. 11 are performed. Then, when the target moving image is input to the arithmetic processing apparatus 10 in a state in which each of the estimator 32, the generator 34, and the determiner 36 is learned, generation processing illustrated in FIG. 12 is performed in the arithmetic processing apparatus 10. The estimator learning processing, the generator learning processing, the determiner learning processing, and the generation processing are an example of an arithmetic processing method of the disclosed technology.

Figure 9:
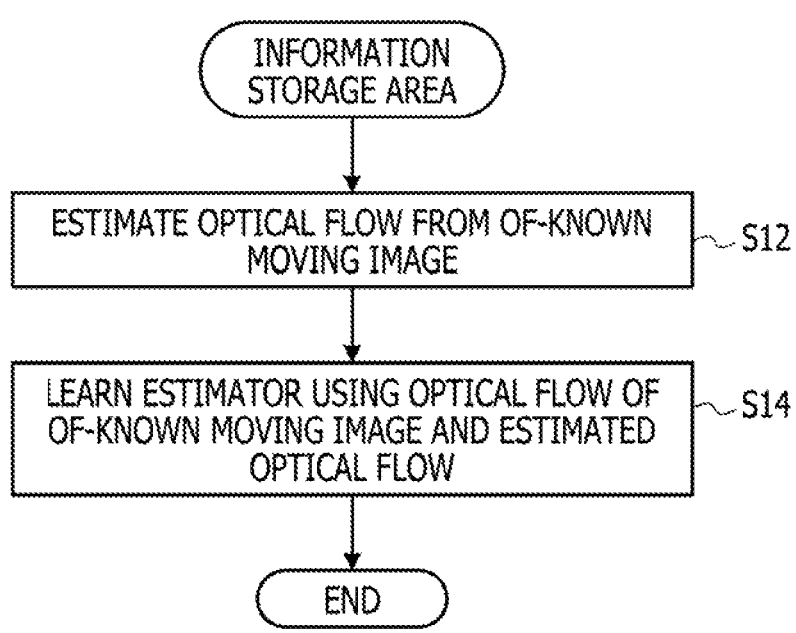
FIG. 9 is a flowchart illustrating an example of estimator learning processing in the first embodiment.

First, the estimator learning processing illustrated in FIG. 9 will be described.

In step S12, the estimation unit 12 divides the input OF-known moving image into frames and estimates an optical flow from images of two consecutive frames.

Next, in step S14, the estimator learning unit 18 uses the known optical flow in the OF-known moving image and the optical flow estimated in step S12 described above to learn the parameters of the estimator 32 so as to minimize the loss function $L_0$ expressed by, for example, Equation (2). Then, the estimator learning processing ends.

Next, the generator learning processing illustrated in FIG. 10 will be described.

In step S22, the estimation unit 12 divides the input moving image with sound wave into frames and estimates an optical flow from images of two consecutive frames.

Next, in step S24, the generation unit 14 inputs the optical flow estimated in step S22 described above to the generator 34 and generates a sound wave.

Next, in step S26, the determination unit 16 inputs the sound wave generated in step S24 described above to the determiner 36, determines whether the generated sound wave is true or false, and outputs the determination result.

Next, in step S28, the generator learning unit 20 uses the sound wave generated in step S24 described above, the sound wave of the moving image with sound wave, and the determination result obtained in step S26 described above to learn the parameters of the generator 34 so as to minimize the loss function $L_1$ expressed by, for example, Equation (5). Then, the generator learning processing ends.

Next, the determiner learning processing illustrated in FIG. 11 will be described. In the determiner learning processing, processing similar to those in the generator learning processing are denoted by the same step numbers and detailed description thereof is omitted.

An optical flow is estimated from a moving image with sound wave in step S22, and a sound wave is generated from the estimated optical flow in step S24.

Next, in step S36, the determiner learning unit 22 uses the sound wave of the moving image with sound wave as true data and the sound wave generated in step S24 described above as false data to learn the parameters of the determiner 36 so as to minimize the loss function $L_2$ expressed by, for example, Equation (6). Then, the determiner learning processing ends.

Next, the generation processing illustrated in FIG. 12 will be described.

In step S42, the estimation unit 12 divides the input target moving image into frames and estimates an optical flow from images of two consecutive frames.

Next, in step S44, the generation unit 14 inputs the optical flow estimated in step S42 described above to the generator 34 and generates a sound wave.

Next, in step S46, the generation unit 14 outputs the generated sound wave from a speaker (not illustrated) and the generation processing ends.

As described above, according to the arithmetic processing apparatus in the first embodiment, the generator that generates a sound wave corresponding to the input optical flow is learned by associating the time of the optical flow estimated from the moving image with the sound wave with the time of the sound wave of the moving image with sound wave. Then, for example, an optical flow estimated from a target moving image obtained by imaging a state in which the user performs an arbitrary operation is input to the generator, and a sound wave corresponding to the target moving image is generated. Thus, a sound wave corresponding to an arbitrary operation may be generated.

Second Embodiment

Next, a second embodiment will be described. In an arithmetic processing apparatus according to the second embodiment, parts similar to those in the arithmetic processing apparatus 10 according to the first embodiment are denoted by the same reference numerals and detailed description thereof is omitted.

As illustrated in FIG. 1, an arithmetic processing apparatus 210 according to the second embodiment functionally includes an estimation unit 12, a generation unit 214, a determination unit 16, an estimator learning unit 18, a generator learning unit 20, and a determiner learning unit 22. An estimator 32, a generator 34, and a determiner 36 are stored in a predetermined storage area of the arithmetic processing apparatus 210.

Figure 13:
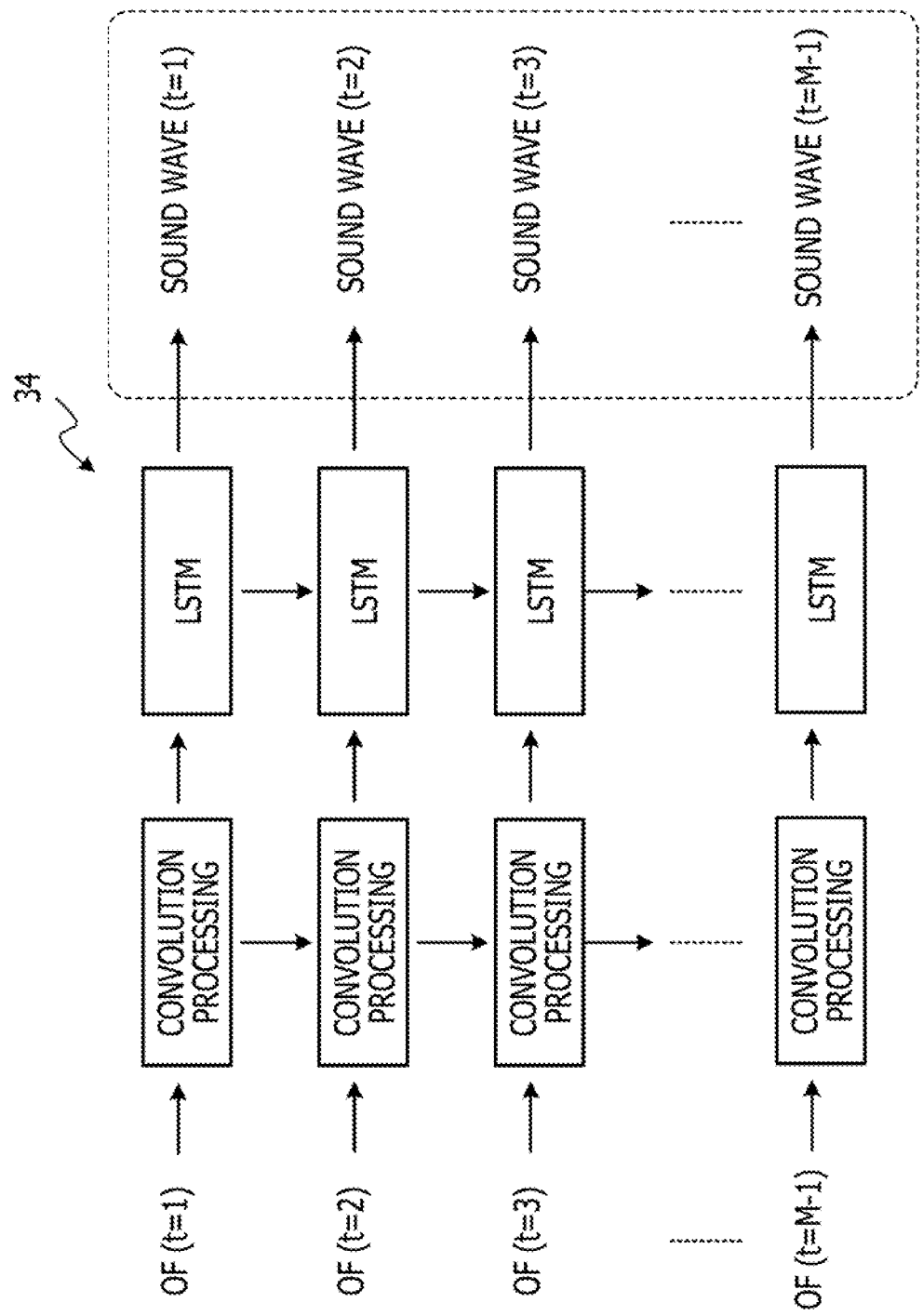
FIG. 13 is a diagram for explaining processing of a generation unit in the second embodiment.

As illustrated in FIG. 13, the generation unit 214 inputs information obtained by dimensionally compressing the optical flow estimated by the estimation unit 12 by convolution processing to the generator 34.

The arithmetic processing apparatus 210 may be implemented by a computer 40 illustrated in, for example, FIG. 8. A storage unit 43 of the computer 40 stores an arithmetic processing program 250 for causing the computer 40 to function as the arithmetic processing apparatus 210. The arithmetic processing program 250 includes an estimation process 52, a generation process 254, a determination process 56, an estimator learning process 58, a generator learning process 60, and a determiner learning process 62. The storage unit 43 includes an information storage area 70 in which information configuring each of the estimator 32, the generator 34, and the determiner 36 is stored.

A CPU 41 reads the arithmetic processing program 250 from the storage unit 43, develops the arithmetic processing program 250 in a memory 42, and sequentially executes the processes of the arithmetic processing program 250. The CPU 41 operates as the generation unit 214 illustrated in FIG. 1 by executing the generation process 254. The other processes are similar to those in the arithmetic processing program 50 according to the first embodiment. The computer 40 that has executed the arithmetic processing program 250 thus functions as the arithmetic processing apparatus 210.

The functions that are implemented by the arithmetic processing program 250 may also be implemented by, for example, a semiconductor integrated circuit such as an ASIC.

Figure 14:
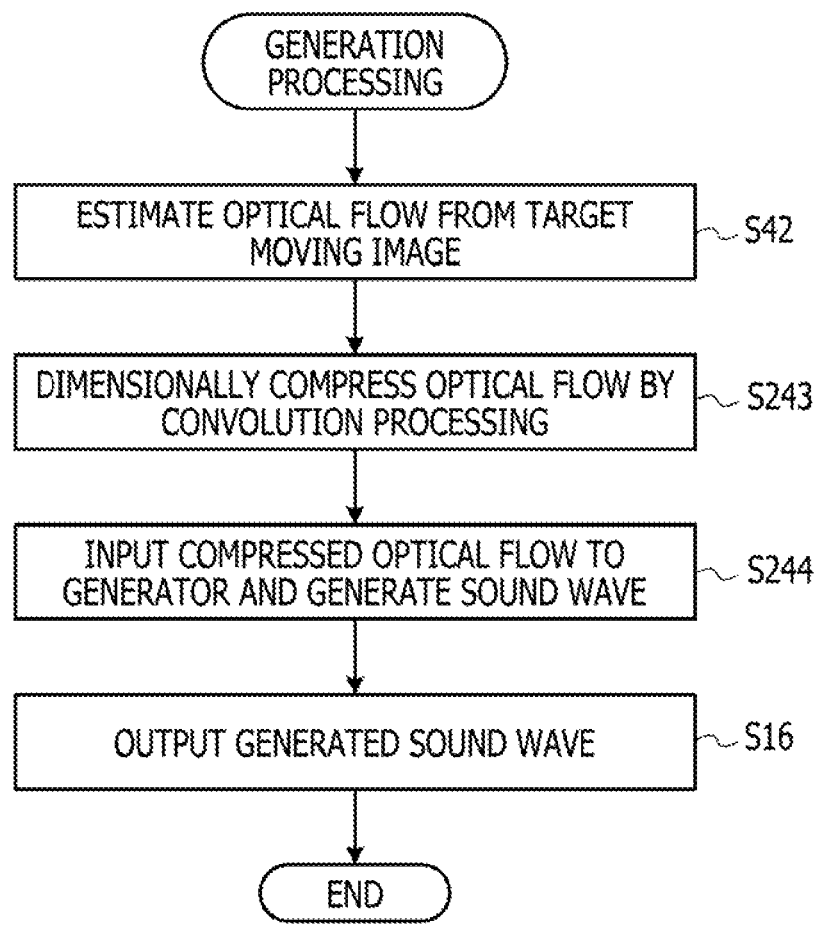
FIG. 14 is a flowchart illustrating an example of generation processing in the second embodiment.

Next, the operation of the arithmetic processing apparatus 210 according to the second embodiment will be described. In the second embodiment, generation processing illustrated in FIG. 14 is performed in the arithmetic processing apparatus 210. In the generation processing of the second embodiment, processing similar to those in the generation processing (FIG. 12) of the first embodiment are denoted by the same reference numerals and detailed description thereof is omitted.

In step S243, the generation unit 214 dimensionally compresses the optical flow estimated in step S42 by convolution processing.

Next, in step S244, the generation unit 214 inputs the optical flow dimensionally compressed in step S243 described above to the generator 34 and generates a sound wave.

In the second embodiment as well, the estimator learning processing (FIG. 9), the generator learning processing (FIG. 10), and the determiner learning processing (FIG. 11) are performed as in the first embodiment. However, in step S24 of the generator learning processing and the determiner learning processing, the optical flow estimated from the moving image with sound wave is dimensionally compressed and the result is input to the generator 34 as in steps S243 and S244 described above.

As described above, according to the second embodiment, an optical flow is input to a generator for generating a sound wave from the optical flow after being dimensionally compressed. This may reduce the processing load on the generator.

Third Embodiment

Next, a third embodiment will be described. In an arithmetic processing apparatus according to the third embodiment, parts similar to those in the arithmetic processing apparatus 10 according to the first embodiment are denoted by the same reference numerals and detailed description thereof is omitted.

As illustrated in FIG. 1, an arithmetic processing apparatus 310 according to the third embodiment functionally includes an estimation unit 12, a generation unit 314, a determination unit 16, an estimator learning unit 18, a generator learning unit 20, and a determiner learning unit 22. An estimator 32, a generator 34, and a determiner 36 are stored in a predetermined storage area of the arithmetic processing apparatus 210.

In the second embodiment, the dimensional compression of the optical flow is performed by the convolution processing in the generation unit 214, but there is a problem that the processing time increases by the convolution processing.

Figure 15:
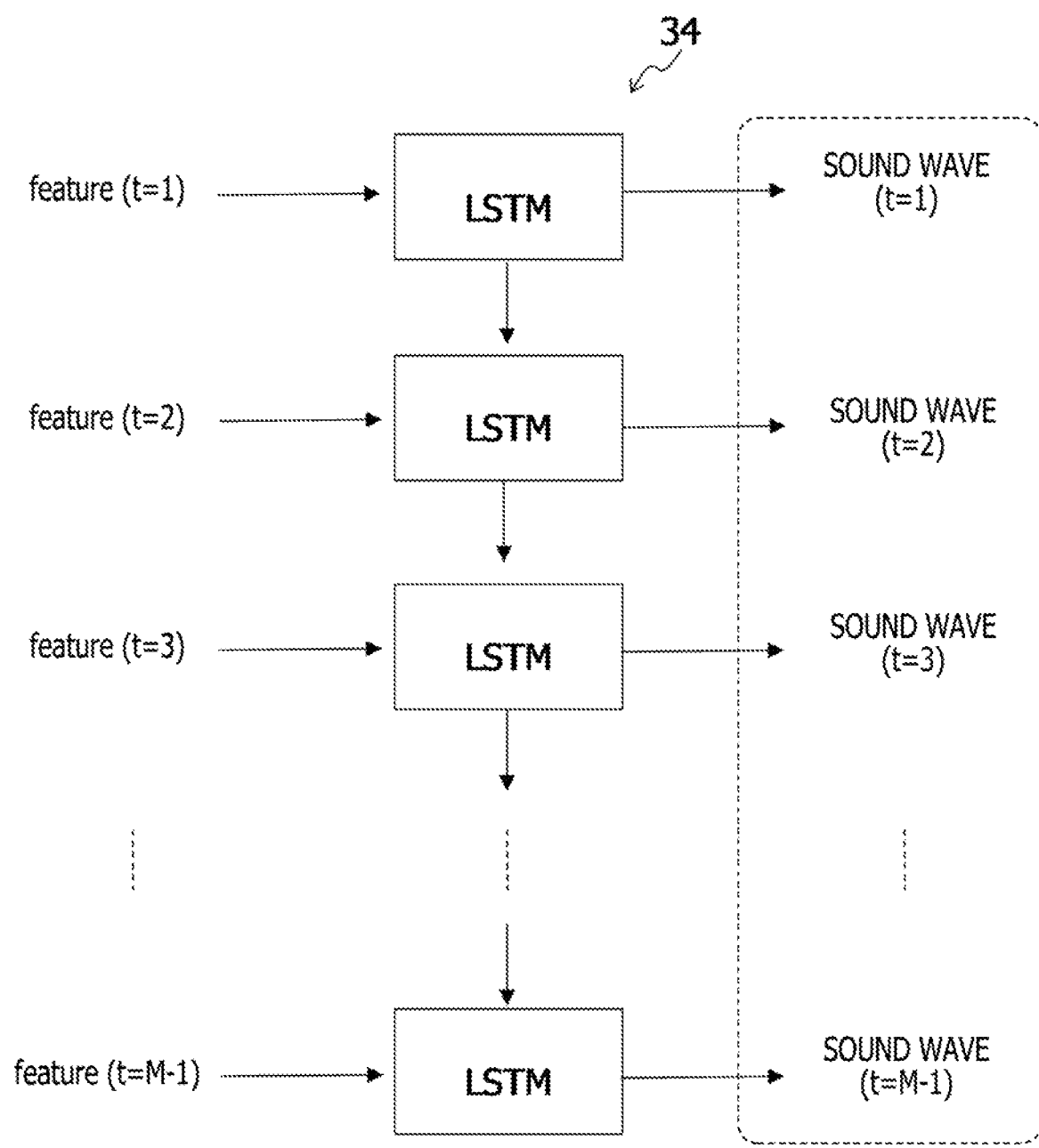
FIG. 15 is a diagram for explaining processing of a generation unit in the third embodiment.

Therefore, as illustrated in FIG. 15, the generation unit 314 according to the third embodiment inputs a feature extracted when the estimation unit 12 estimates the optical flow to the generator 34. The feature extracted by the estimation unit 12 is information in which the feature of optical flow is condensed and thus is used instead of the optical flow itself.

The arithmetic processing apparatus 310 may be implemented by a computer 40 illustrated in, for example, FIG. 8. A storage unit 43 of the computer 40 stores an arithmetic processing program 350 for causing the computer 40 to function as the arithmetic processing apparatus 310. The arithmetic processing program 350 includes an estimation process 52, a generation process 354, a determination process 56, an estimator learning process 58, a generator learning process 60, and a determiner learning process 62. The storage unit 43 includes an information storage area 70 in which information configuring each of the estimator 32, the generator 34, and the determiner 36 is stored.

A CPU 41 reads the arithmetic processing program 350 from the storage unit 43, develops the arithmetic processing program 350 in a memory 42, and sequentially executes the processes of the arithmetic processing program 350. The CPU 41 operates as the generation unit 314 illustrated in FIG. 1 by executing the generation process 354. The other processes are similar to those in the arithmetic processing program 50 according to the first embodiment. The computer 40 that has executed the arithmetic processing program 350 thus functions as the arithmetic processing apparatus 310.

The functions that are implemented by the arithmetic processing program 350 may also be implemented by, for example, a semiconductor integrated circuit such as an ASIC.

Figure 16:
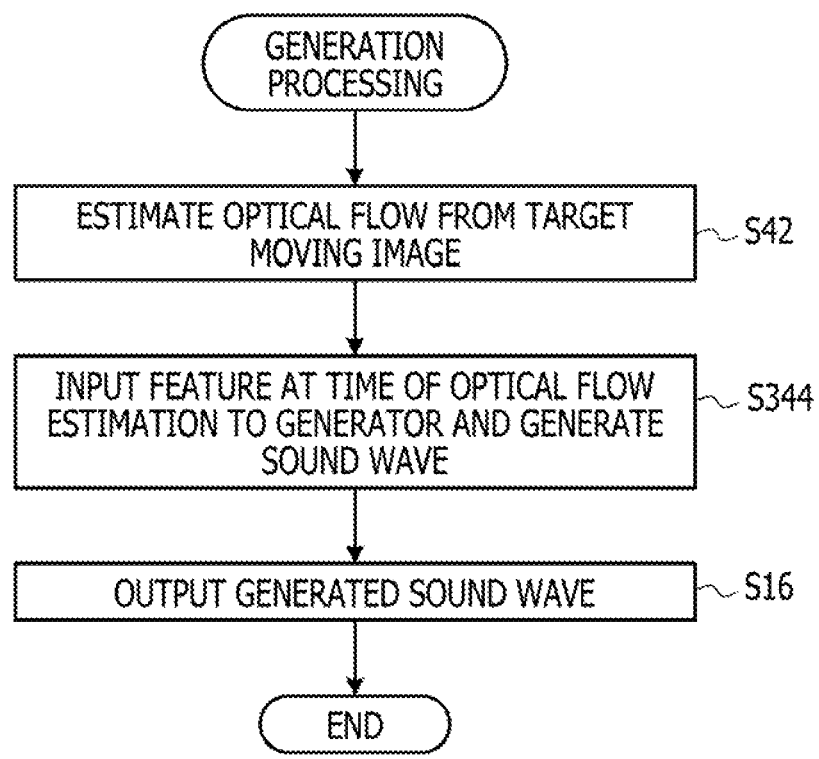
FIG. 16 is a flowchart illustrating an example of generation processing in the third embodiment.

Next, the operation of the arithmetic processing apparatus 310 according to the third embodiment will be described. In the third embodiment, generation processing illustrated in FIG. 16 is performed in the arithmetic processing apparatus 310. In the generation processing of the third embodiment, processing similar to those in the generation processing (FIG. 12) of the first embodiment are denoted by the same reference numerals and detailed description thereof is omitted.

In step S344, the generation unit 314 inputs the feature extracted when the optical flow is estimated in step S42 to the generator 34 and generates a sound wave.

In the third embodiment as well, the estimator learning processing (FIG. 9), the generator learning processing (FIG. 10), and the determiner learning processing (FIG. 11) are performed as in the first embodiment. However, in step S24 of the generator learning processing and the determiner learning processing, the feature extracted when the optical flow is estimated is input to the generator 34 as in step S344 described above.

As described above, according to the third embodiment, a feature extracted when an optical flow is estimated is input to a generator for generating a sound wave from the optical flow. In this way, by using the feature extracted by the estimation unit in the generation unit, the processing load of the generator may be reduced and the computation amount of the entire generation unit may be reduced by omitting the calculation of convolution processing as in the second embodiment.

Fourth Embodiment

Next, a fourth embodiment will be described. In an arithmetic processing apparatus according to the fourth embodiment, parts similar to those in the arithmetic processing apparatus 10 according to the first embodiment are denoted by the same reference numerals and detailed description thereof is omitted.

Figure 17:
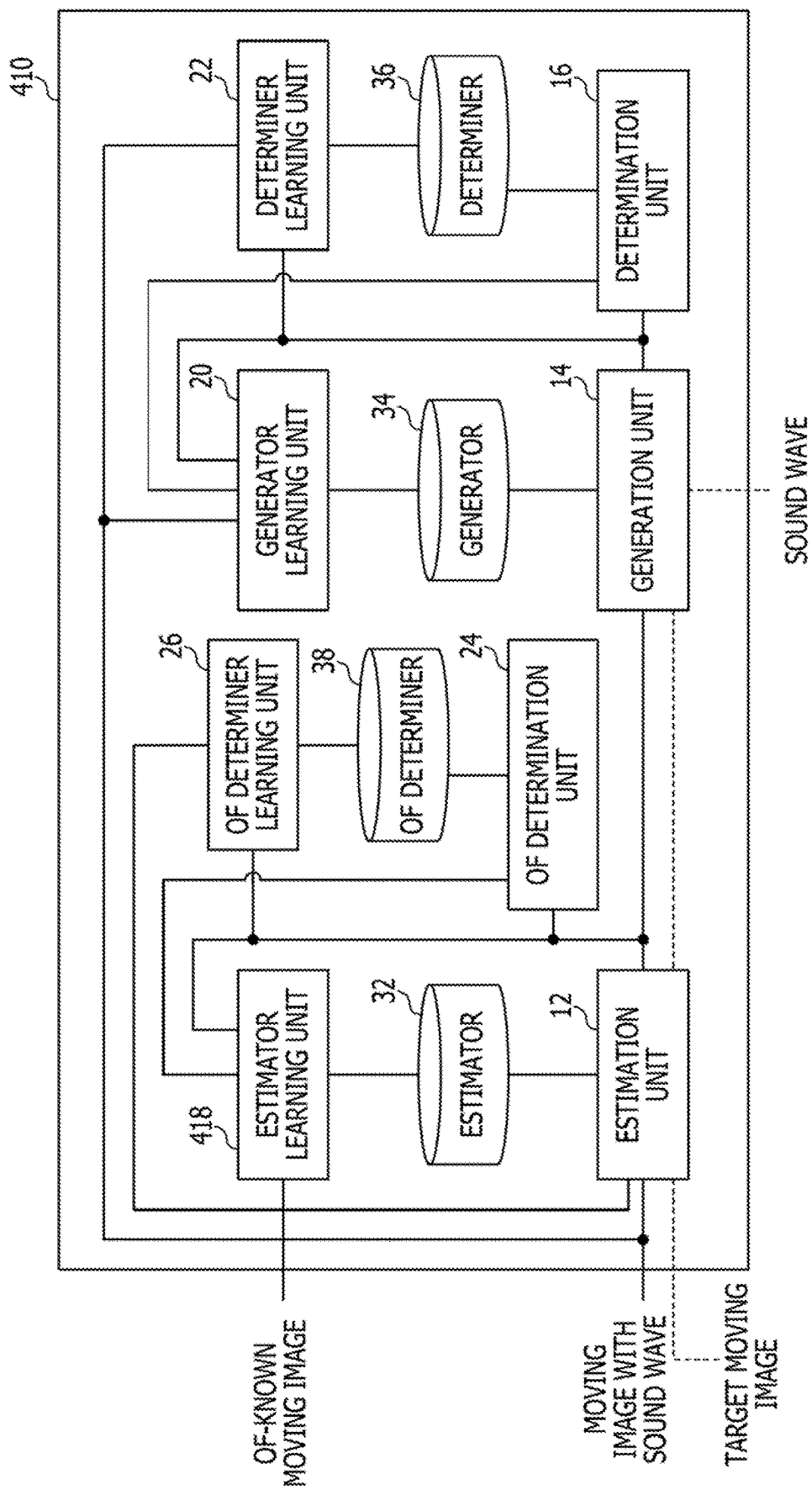
FIG. 17 is a functional block diagram of an arithmetic processing apparatus according to the fourth embodiment.

As illustrated in FIG. 17, an arithmetic processing apparatus 410 according to the fourth embodiment functionally includes an estimation unit 12, a generation unit 14, a determination unit 16, an estimator learning unit 418, a generator learning unit 20, a determiner learning unit 22, an OF determination unit 24, and an OF determiner learning unit 26. An estimator 32, a generator 34, a determiner 36, and an OF determiner 38 are stored in a predetermined storage area of the arithmetic processing apparatus 410.

Figure 18:
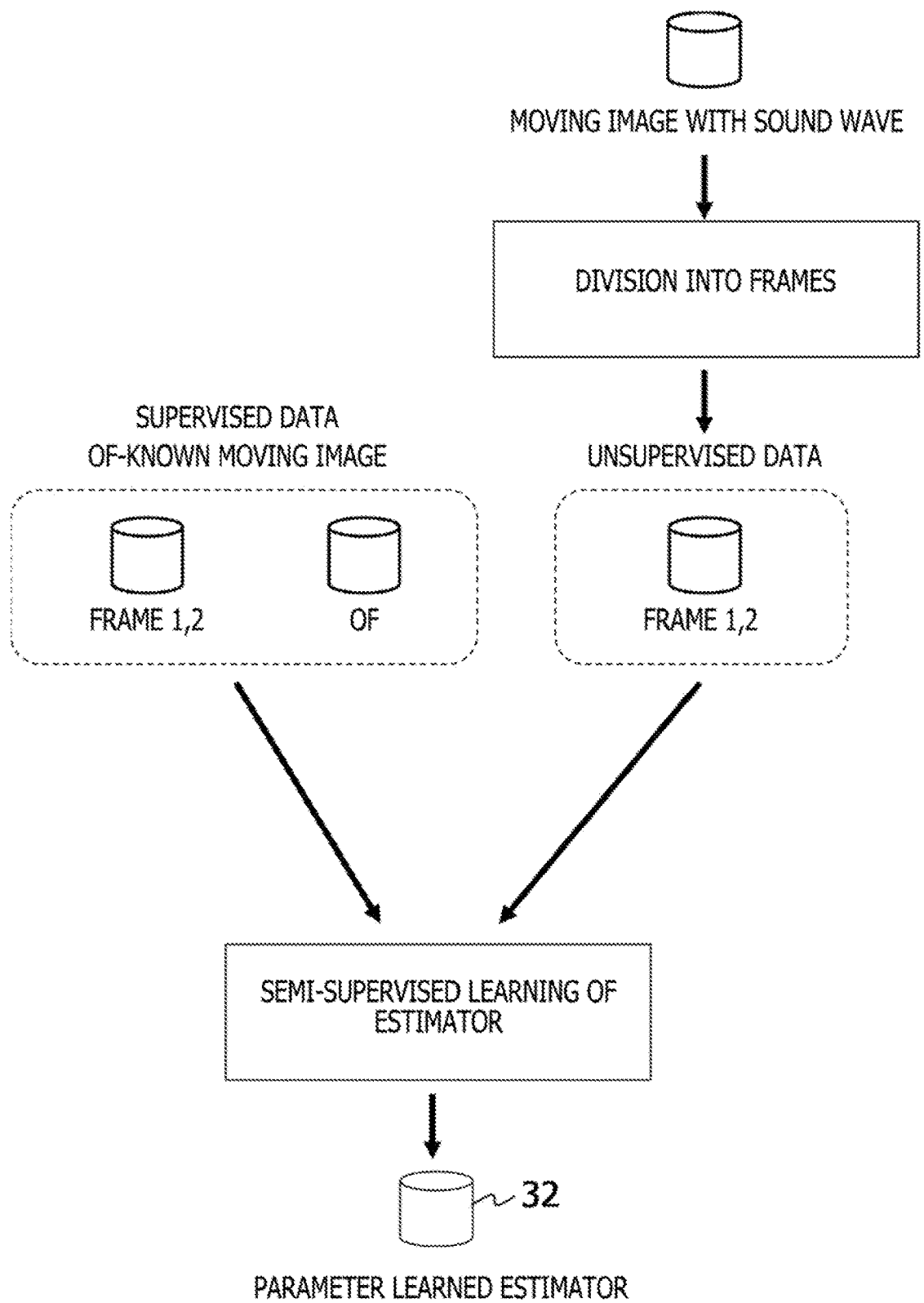
FIG. 18 is a diagram for explaining learning of an estimator in the fourth embodiment.

In a situation in which the moving image with sound wave and the OF-known moving image used for learning the parameters of the estimator 32 are significantly different from each other, for example, in terms of data domains, there is a problem that the estimation accuracy of optical flow by the estimation unit 12 is not improved. Therefore, in the fourth embodiment, as illustrated in FIG. 18, semi-supervised learning of the estimator 32 is performed using the OF determination unit 24 with the OF-known moving image as supervised data and the moving image with sound wave as unsupervised data to improve the estimation accuracy of the estimation unit 12.

The estimator learning unit 418 learns the parameters of the estimator 32 so as to minimize a loss function obtained by adding a term indicating the degree to which the estimated optical flow is determined to be false by the OF determination unit 24 described later to the loss function used in the estimator learning unit 18 of the first embodiment.

For example, the estimator learning unit 418 learns the parameters of the estimator 32 so as to minimize a loss function $L_3$ represented by Equation (7) by using stochastic gradient descent (SGD) or the like.

$$L_3 = \sum_t \left\| O(I_{1,t}, I_{2,t}) - \overline{O}(I_{1,t}, I_{2,t}) \right\|_2 + \left\| W_{arp}(\overline{O}(I_{1,t}, I_{2,t}), I_{2,t}) - I_{1,t} \right\|_2 + \quad (7)$$

$$\left\| W_{arp}(\overline{O}(I_{1,t}, I_{2,t}), I_{2,t}) - W_{arp}(O(I_{1,t}, I_{2,t}), I_{2,t}) \right\|_2 +$$

$$\left\| E_{dge}(\overline{O}(I_{1,t}, I_{2,t})) - E_{dge}(O(I_{1,t}, I_{2,t})) \right\|_2 + \sum_{J_1, J_2} \log(1 - D_{is,opt}(\overline{O}(J_1, J_2)))$$

In Equation (7), $I_{1,t}$ and $I_{2,t}$ respectively represent frames 1 and 2 of supervised data, for example, the OF-known moving image, and $J_{1,t}$ and $J_{2,t}$ respectively represent frames 1 and 2 of unsupervised data, for example, the moving image with sound wave. $D_{is,opt}(O^-(J_{1,t}, J_{2,t}))$ of the fifth term in Equation (7) is the determination result for $(O^-(J_{1,t}, J_{2,t}))$ obtained by the OF determination unit 24 and is true (1) or false (0).

Figure 19:
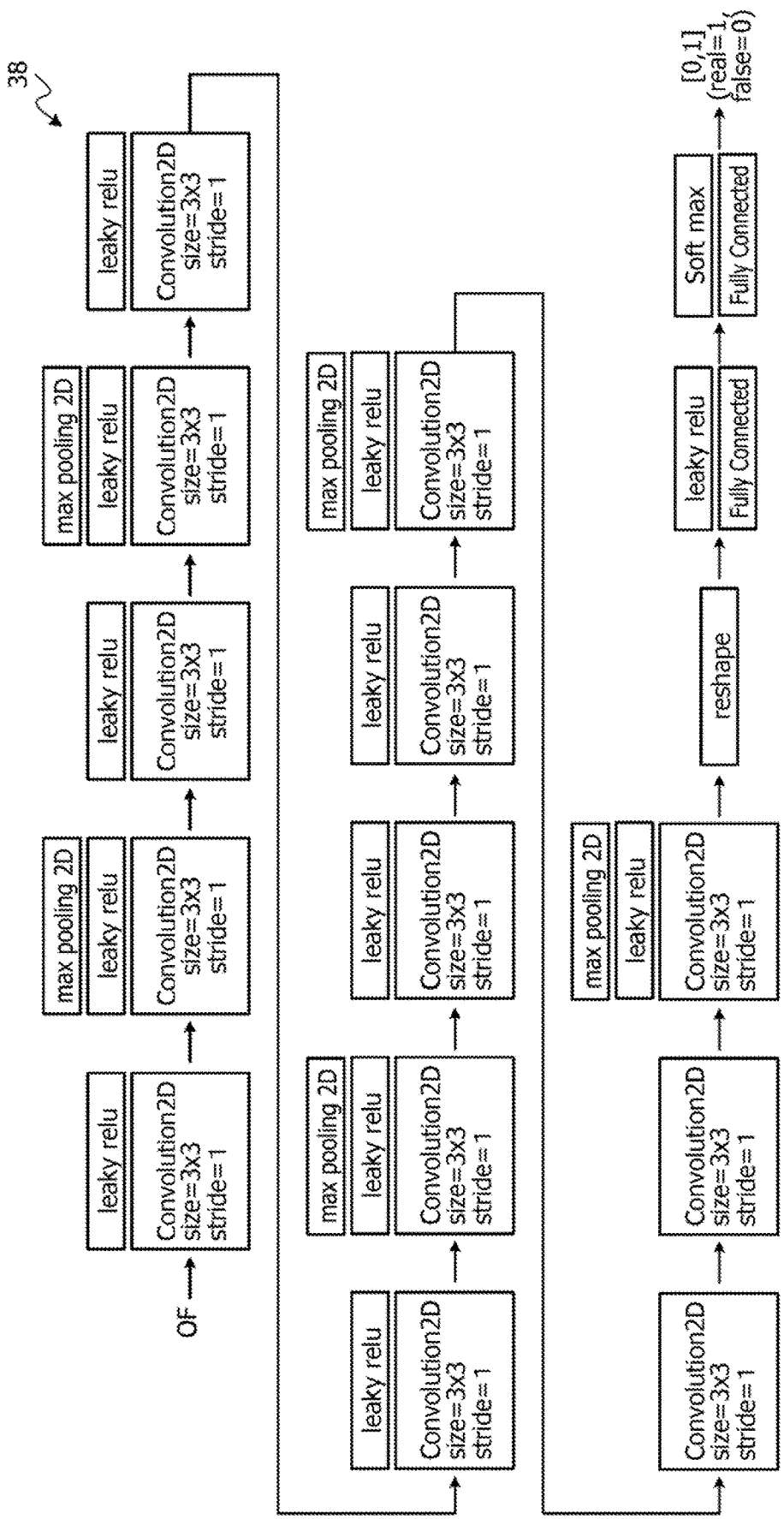
FIG. 19 is a diagram illustrating an example of an OF determiner.

The OF determination unit 24 determines whether the optical flow estimated by the estimation unit 12 is true or false using the OF determiner 38 that determines whether the input optical flow is true or false. The OF determiner 38 may be configured by a CNN as illustrated in, for example, FIG. 19.

The OF determiner learning unit 26 learns the parameters of the OF determiner 38 using the optical flow of the supervised data as true data and the optical flow estimated for the supervised data by the estimation unit 12 as false data.

For example, the OF determiner learning unit 26 learns the parameters of the OF determiner 38 so as to minimize the loss function including a term that decreases as the true data is determined to be true and a term that decreases as the false data is determined to be false.

For example, the OF determiner learning unit 26 learns the parameters of the OF determiner 38 so as to minimize a loss function $L_4$ represented by Equation (8) below by using stochastic gradient descent (SGD) or the like.

$$L_4 = \Sigma_t \log(1 - D_{is,opt}(O(I_{1,t}, I_{2,t}))) + \Sigma_t \log(D_{is,opt}(\overline{O}(I_{1,t}, I_{2,t}))) \quad (8)$$

The arithmetic processing apparatus 410 may be implemented by a computer 40 illustrated in, for example, FIG. 8. A storage unit 43 of the computer 40 stores an arithmetic processing program 450 for causing the computer 40 to function as the arithmetic processing apparatus 410. The arithmetic processing program 450 includes an estimation process 52, a generation process 354, a determination process 56, an estimator learning process 458, a generator learning process 60, a determiner learning process 62, an OF determination process 64, and an OF determiner learning process 66. The storage unit 43 includes an information storage area 70 in which information configuring each of the estimator 32, the generator 34, the determiner 36, and the OF determiner 38 is stored.

A CPU 41 reads the arithmetic processing program 450 from the storage unit 43, develops the arithmetic processing program 450 in a memory 42, and sequentially executes the processes of the arithmetic processing program 450. The CPU 41 operates as the estimator learning unit 418 illustrated in FIG. 17 by executing the estimator learning process 458. The CPU 41 also operates as the OF determination unit 24 illustrated in FIG. 17 by executing the OF determination process 64. The CPU 41 also operates as the OF determiner learning unit 26 illustrated in FIG. 17 by executing the OF determiner learning process 66. The other processes are similar to those in the arithmetic processing program 50 according to the first embodiment. The computer 40 that has executed the arithmetic processing program 450 thus functions as the arithmetic processing apparatus 410.

The functions that are implemented by the arithmetic processing program 450 may also be implemented by, for example, a semiconductor integrated circuit such as an ASIC.

Next, the operation of the arithmetic processing apparatus 410 according to the fourth embodiment will be described. In the fourth embodiment, the arithmetic processing apparatus 410 performs estimator learning processing illustrated in FIG. 20 and OF determiner learning processing illustrated in FIG. 21.

Figure 20:
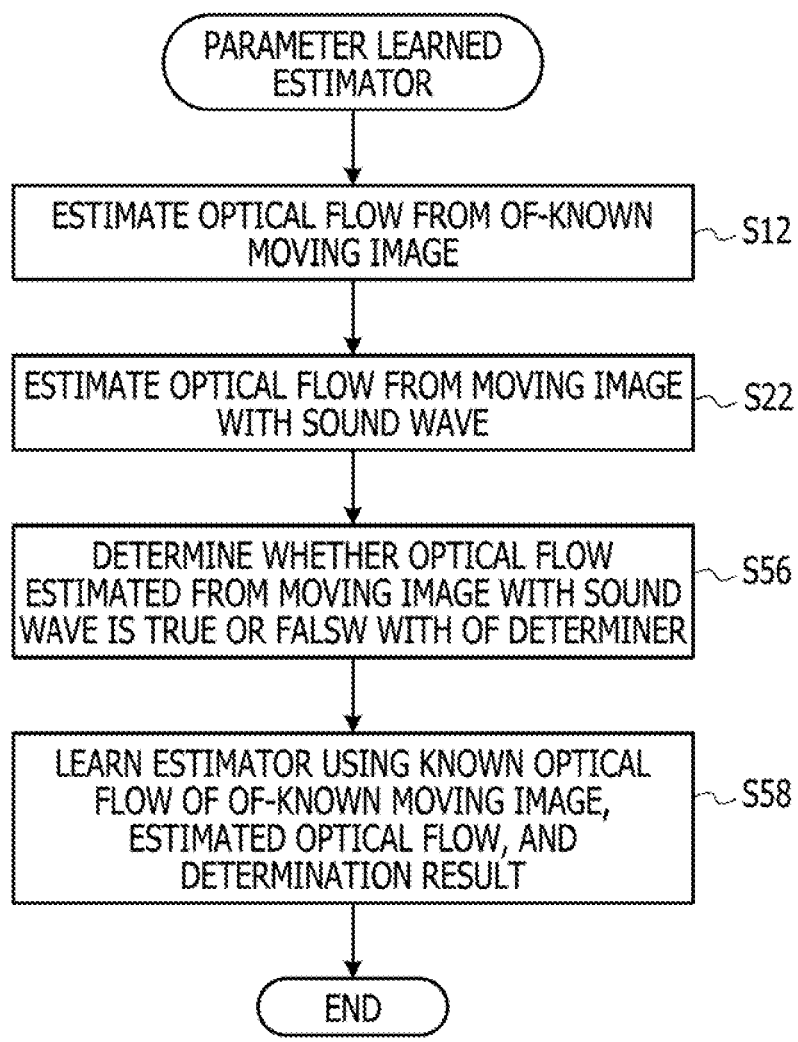
FIG. 20 is a flowchart illustrating an example of estimator learning processing in the fourth embodiment.

First, the estimator learning processing illustrated in FIG. 20 will be described. In the estimator learning processing of the fourth embodiment, processing similar to those in the estimator learning processing (FIG. 9) and generator learning processing (FIG. 10) of the first embodiment are denoted by the same reference numerals and the detailed description thereof is omitted.

In steps S12 and S22, the estimation unit 12 estimates the optical flow of each of the OF-known moving image and the moving image with sound wave.

Next, in step S56, the OF determination unit 24 inputs the optical flow estimated for the moving image with sound wave in step S22 described above to the OF determiner 38, determines whether the estimated optical flow is true or false, and outputs the determination result.

Next, in step S58, the estimator learning unit 418 learns the parameters of the estimator 32 using the known optical flow in the OF-known moving image, the optical flow estimated in step S12 described above, and the determination result obtained in step S56 described above. The estimator learning unit 418 learns the parameters of the estimator 32 so as to minimize, for example, the loss function $L_3$ represented by Equation (7). Then, the estimator learning processing ends.

Next, the OF determiner learning processing illustrated in FIG. 21 will be described. In the OF determiner learning processing, processing similar to those in the estimator learning processing (FIG. 9) are denoted by the same step numbers and detailed description thereof is omitted.

In step S12, the estimation unit 12 inputs the OF-known moving image to the estimator 32 and estimates the optical flow.

Next, in step S62, the OF determiner learning unit 26 sets the known optical flow in the OF-known moving image, for example, the optical flow of supervised data as true data. The OF determiner learning unit 26 also sets the optical flow estimated in step S12 described above as false data. Then, the OF determiner learning unit 26 learns the parameters of the OF determiner 38 using the true data and the false data to so as to minimize, for example, the loss function $L_4$ represented by Equation (8). Then, the OF determiner learning processing ends.

As described above, according to the fourth embodiment, an optical flow of which the correspondence with a moving image is known is used as teacher data and an optical flow estimated for a moving image with sound wave by an estimation unit is used as unsupervised data in learning of an estimator that estimates an optical flow. Thus, a decrease in the estimation accuracy of optical flow may be suppressed when a moving image significantly different from the moving image used for learning of the estimator is input as the target moving image.

It is noted that the respective functional units of the respective embodiments described above may be appropriately combined to carry out the embodiments. For example, in the fourth embodiment, the generation unit 214 of the second embodiment or the generation unit 314 of the third embodiment may be used as the generation unit.

In the respective embodiments described above, a configuration in which the arithmetic processing program is stored (installed) in the storage unit in advance has been described, but the embodiments are not limited to this. The program according to the disclosed technology may be provided in a form of being stored on a storage medium such as a compact disc read-only memory (CD-ROM), a digital versatile disc (DVD)-ROM, or a Universal Serial Bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing apparatus, comprising:
a memory; and
a processor coupled to the memory and the processor configured to:
estimate a first optical flow between consecutive frames of a first moving image, and
generate a first sound wave corresponding to the first moving image based on the first optical flow and a deep neural network that generates a second sound wave corresponding to a second optical flow by associating the second optical flow with time of a second moving image with third sound wave and the third sound wave, the second optical flow being estimated for the second moving image, the deep neural network being trained by decreasing a loss function indicating difference between the third sound wave and the second sound wave.

2. The arithmetic processing apparatus according to claim 1, wherein the deep neural network is a recurrent neural network.

3. The arithmetic processing apparatus according to claim 1, wherein the processor is configured to input information obtained by dimensionally compressing an optical flow by convolution processing to the deep neural network.

4. The arithmetic processing apparatus according to claim 1, wherein the processor is configured to input a feature extracted when the first optical flow is estimated to the deep neural network.

5. The arithmetic processing apparatus according to claim 1, wherein the processor is configured to:
determine whether the generated sound wave is true or false using a convolutional neural network that determines whether an input sound wave is true or false, and
perform learning the deep neural network so as to minimize the loss function further including a term indicating a degree to which the generated sound wave is determined to be false.

6. The arithmetic processing apparatus according to claim 5, wherein the processor is configured to perform learning the convolutional neural network by using the sound wave of the moving image with sound wave as true data and the generated sound wave as false data.

7. The arithmetic processing apparatus according to claim 6, wherein the processor is configured to perform learning the convolutional neural network so as to minimize a loss function including a term that decreases as the true data is determined to be true and a term that decreases as the false data is determined to be false.

8. The arithmetic processing apparatus according to claim 1, wherein the processor is configured to estimate the first optical flow by using an estimator configured by a convolutional neural network.

9. The arithmetic processing apparatus according to claim 8, wherein the processor is configured to estimate the first optical flow while gradually increasing a resolution from a low resolution to a high resolution.

10. The arithmetic processing apparatus according to claim 8, wherein
the first optical flow is a moving image used as the teacher data, and
the processor is configured to perform learning the estimator so as to minimize a loss function including a term indicating an error between an optical flow of the teacher data and an optical flow estimated for the teacher data, a term indicating an error between a frame image warped using the estimated optical flow and a frame image of the teacher data, and a term indicating an error of an edge portion.

11. The arithmetic processing apparatus according to claim 10, wherein
the first optical flow is a moving image used as unsupervised data, and
the processor is configured to:
determine whether an estimated optical flow is true or false by using a convolutional neural network that determines whether an input optical flow is true or false, and
perform learning the estimator so as to minimize the loss function further including a term indicating a degree to which an optical flow estimated for the unsupervised data is determined to be false.

12. The arithmetic processing apparatus according to claim 10, wherein the processor is configured to perform learning the convolutional neural network by using an optical flow of the teacher data as true data and an optical flow estimated for the teacher data as false data.

13. The arithmetic processing apparatus according to claim 10, wherein the processor is configured to learn the convolutional neural network so as to minimize a loss function including a term that decreases as the true data is determined to be true and a term that decreases as the false data is determined to be false.

14. An arithmetic processing method executed by a computer, the arithmetic processing method comprising:
estimate a first optical flow between consecutive frames of a first moving image; and
generate a first sound wave corresponding to the first moving image based on the first optical flow and a deep neural network that generates a second sound wave corresponding to a second optical flow by associating the second optical flow with time of a second moving image with third sound wave and the third sound wave, the second optical flow being estimated for the second moving image, the deep neural network being trained by decreasing a loss function indicating difference between the third sound wave and the second sound wave.

* * * * *